2,899,342
PROCESS AND APPARATUS FOR CLARIFYING AND DESUGARISING A CARBONATION SLUDGE

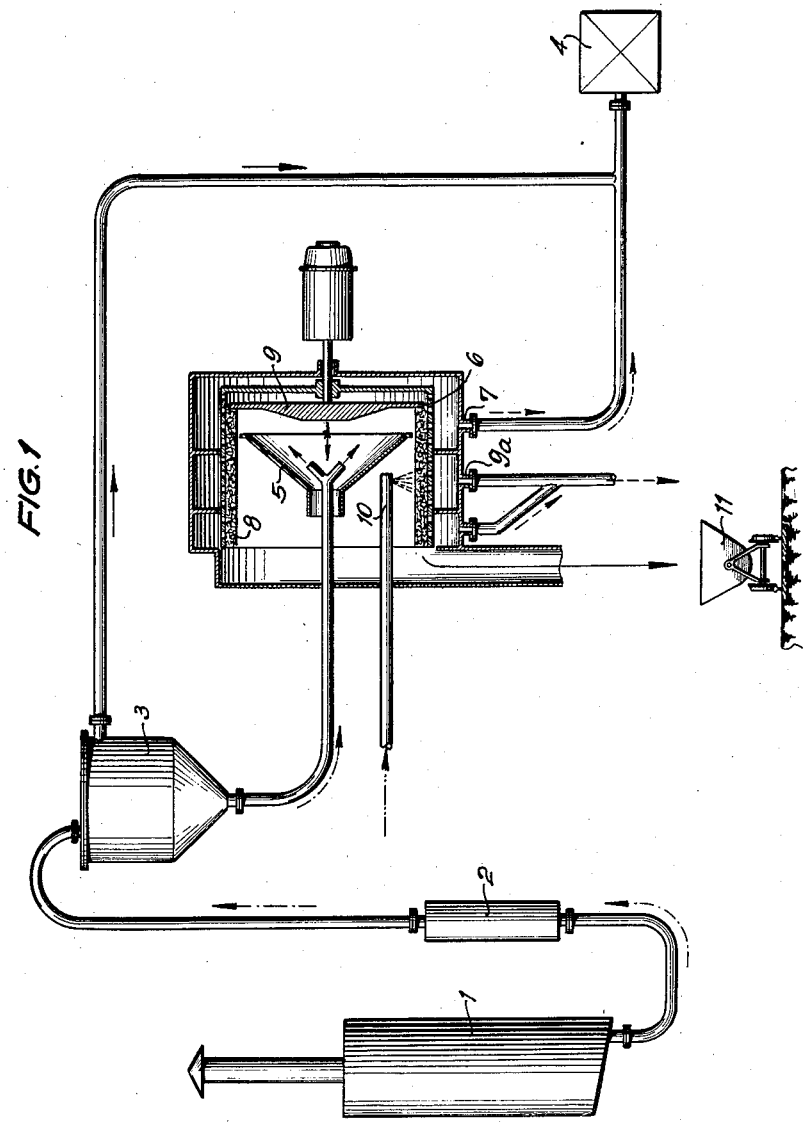

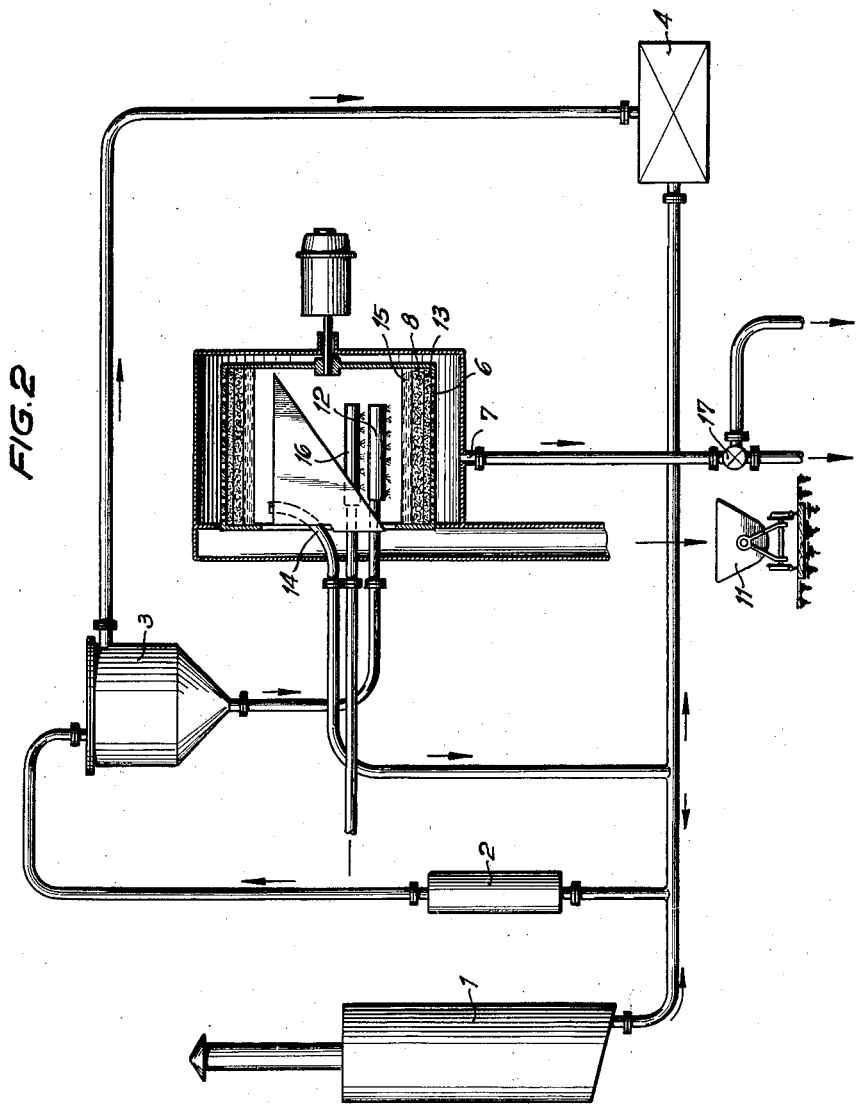

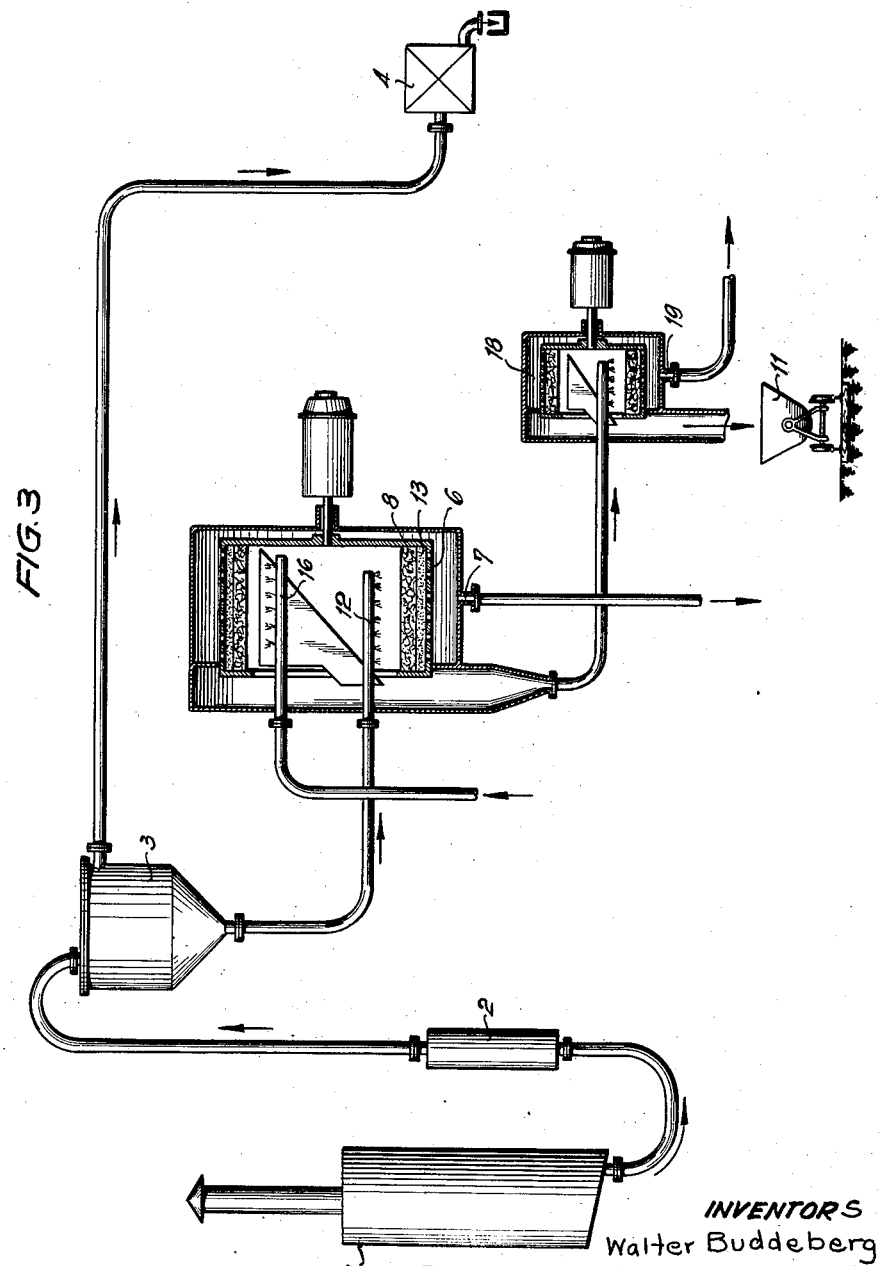

Walter Buddeberg, Starnberg, and Paul Matthias Franz Heinrich Nebel, Braunschweig, Germany, assignors to Firma Krauss-Maffei Aktiengesellschaft, Munich-Alloch, Germany Application June 2, 1954, Serial No. 434,018

5 Claims. (Cl. 127—56)

In the sugar industry, the juice obtained from beets or cane sugar is faced from the non-sugar substance by the known carbonation process in order to obtain a sugar solution which is as clear and as pure as possible. With this known purification of the juice, which is effected by addition of lime and carbon dioxide, there is formed a carbonation sludge which is composed, for example, of calcium carbonate and purified sugar juice. For separating this sugar juice from the carbonation sludge of the first and second carbonation operations, there are employed almost exclusively filter presses in which the solid and undissolved constituents of the juice are held back by filter cloths consisting of a jute, cotton or cotton drill cover and the so-called scum or press cake is formed in the filter frames, while the clarified juice flows out of the presses.

After the press frames are filled with sludge, the desugarising of the sludge cake is effected with water, which is forced or drawn through the cake surface until a certain minimum sugar content of the sludge is obtained.

The operation of these filtering stations is very dirty, since it is never possible entirely to avoid a spraying of the presses, which are at a pressure of several atmospheres. On the other hand, the use of these presses requires a large filtering area and a comparatively large number of working personnel, which is required because of the unpacking of the presses, the cleaning of the frames, the reassembly of the presses and also the frequent replacement of the filter cloths, which are subject to heavy wear. Consequently, it is comparatively expensive to operate the filtering stations, owing to the necessary manual operations and the high consumption of filtering material.

Repeated attempts have therefore been made to develop a continuous and mechanical form of these filter stations without, however, these experiments leading to a successful result, since it has not been possible, on the one hand, to obtain a sufficiently dry and desugarised sludge and, on the other hand, the centrifuged juice was not sufficiently clear. For example, it has already been proposed, for the purpose of extracting the sugar from the carbonation sludge, to make use of the filter centrifuges frequently used elsewhere in the sugar industry and in this case to step up the centrifuging force by increasing the speed of revolution to such an extent that the sludge retained in the centrifuge shows only a small moisture content of about 15 to 20%. Apart from the fact that the filtration is only effected slowly owing to the fineness of the sludge, whereby a large number of such centrifuging filters are necessary, it is in particular not possible in this case for the speed of revolution and thus the cengtrifuing or separating force to be arbitrarily increased, since according to the fineness of the sludge, the latter is compressed to such an extent upon exceeding a certain speed that it is no longer possible for moisture to pass outwardly. This known process consequently does not lead to any result with all sludges, and is also too expensive in view of the large number of centrifuging filters which are necessary.

In contrast hereto, the invention has for its object to develop a process for clarifying and desugarising the carbonation sludges which, by making use of centrifuges which are continuously operating in the customary speed ranges or mechanically controlled skimming centrifuges, requires not only the shortest possible expenditure of time, but also only a small number of machines, and at the same time avoids to a large extent the disadvantages of manual work.

In order to attain this object, it is proposed that the sludge juices of the first and second carbonation are fed, for the initial clarification and concentration, first of all by way of a preheater to a thickener, for example, a separator, a solid walled centrifuge or the like, and the sludge initially thickened in the latter is fed forward into centrifuges continuously operated at the customary speeds or into mechanically operated peeler centrifuges in which the deposited or filtered sludge is covered and desugarised with steam or hot water or possibly in peeling is wetted with water and subsequently again passed through a centrifuge for another filtering and desugarising. It is preferred that thickened sludge juices of good filtering capacity are centrifuged out in fully continuous pusher centrifuges, in which the washing out of the deposited sludges is effected continuously and in one working operation with the filtration. In order to increase the clarification effect, the centrifuge drum is also equipped with an additional readily replaceable filtering medium, for example, a layer of kieselguhr, as well as the usual filter cloth covering. Since in many cases the filtration is only carried out very slowly owing to the fineness of the sludge, the peeler centrifuge, in addition to comprising the usual peeler blade for peeling out the dry centrifuged sludge, also has a peeler tube which serves for peeling out the juice layer which has accumulated above the sludge layer.

As compared with the known processes, the steps proposed in accordance with the invention present important advantages in so far that only very small quantities of water or steam are required for the washing out, since only quite a small quantity of liquid has to be displaced from the sludge, which has been initially dried to the fullest possible extent in the screening centrifuge. In particular, the evaporation costs are considerably reduced owing to the small water consumption which is required. The operation itself can be carried out in a fully mechanical or fully automatic manner. The filter stations still necessary for the thick juice already initially separated in the thickener can be kept very small and thus the manual labour and particularly the wear of expensive filter cloths can be considerably reduced. In addition, the separated sludge is obtained in a considerably drier condition, so that thereby the final drying costs are saved and losses of juice avoided.

Various diagrammatic arrangements for carrying into effect the process in accordance with the invention are shown in the drawing, wherein:

Figure 1 shows the running of the process when using a continuous pusher centrifuge;

Figure 2 is a similar arrangement when using a peeling centrifuge with direct washing out and a built-in peeling tube;

Figure 3 is a similar arrangement when using a peeling centrifuge with a centrifuge on the output side for further washing out.

In the process using the arrangement shown in Figure 1, which presupposed sludge juices of good filtering property, the sludge juice formed in the carbonation vessels 1 is led by way of a preheater 2 into a thickener 3, which may be a separator or a solid-walled centrifuge. The juice which is being formed by concentration and which at present only contains a little thick juice, is conducted for final filtration and clarification to a filter press 4 of the kind previously used, while the thickened sludge juice flows by way of the inlet hopper 5 into the centrifuging drum 6 of a pusher centrifuge. Under the effect of centrifugal force, the juice of the sludge in the centrifuging drum 6 is centrifuged out as thick juice and passes, for the purpose of recovering the clear juice, by way of the discharge 7 together with the thick juice coming from the thickener 3 into the filter presses 4, while the sludge layer 8 deposited in the centrifuge drum 6 is continuously moved towards the open end of the drum by the oscillatory movement of the push bottom 9. As it travels through the centrifuge drum 6, the sludge layer 8 is washed out by the fact that water is sprayed in by means of a washing device 10. The washing water leaves the centrifuge by way of the discharge pipe 9a and passes from thence to be used in the customary manner, while the ejected sludge is carried away by transport means 11. The filter presses in this arrangement may, however, in contrast to the known processes with hand operation, be kept in operation very much longer before they have to be emptied, cleaned and the filter cloths changed.

In the arrangement according to Figure 2 for carrying out the process in accordance with the invention, the sludge juices formed in the carbonation vessels 1 are also led by way of a preheater 2 into a thickener 3, from which the initially separated juice containing only a little thick juice passes to a filter press 4 in the same way as in the first embodiment. The initially thickened or concentrated sludge juice is, however, fed by way of the supply device 12 to the centrifuging drum 6 of a peeler centrifuge. Since it is found from experience that the sludge juices are not always adapted to be equally well centrifuged, it is necessary to take certain steps, known per se, in order to achieve a sufficient clarification of the juice, and an adequate washing out of the sludge while maintaining an adequate output. In addition to having filter cloths, which by themselves are not sufficient in order to produce an adequate clarity of the juice, the centrifuge drum 6 is therefore also fitted with a separate filtering medium, for example, with a layer 13 of kieselguhr. When the said layer has become non-pervious after a number of centrifuging operations, this can be easily removed and replaced by a fresh filter layer. In this way, the filtered juice which is obtained is of sufficient clearness.

Owing to the great fineness of many carbonation sludges, the filtration only proceeds very slowly, so that in order to maintain a certain output, it is necessary to use a large number of machines and the process would be uneconomic. In order from the outset to obviate this disadvantage, there is incorporated a skimming tube 14, which skims out the juice layer 15 which forms after a short centrifuging time under the action of centrifugal force above the sludge layer 8 and which is still not thoroughly filtered. The juice which is skimmed out is either led into the filter press 4 for final filtration and complete clarification in the same manner as the initially separated juice from the thickener 3, or it is returned to the thickener, while the juice centrifuged out by the centrifuge drum 6 is led away through the discharge 7 as clear juice. Therefore, it is not necessary to wait for the filtration of the entire quantity of juice, whereby considerable time is saved and the process is thereby made economic. After the clear juice has been centrifuged off and after the thick juice above the sludge layer 8 has been skimmed off, the latter is covered with water through a spray tube 16 and simultaneously washed out, whereby the washed-out juice, which also flows out through the discharge 7, passes by way of a change-over member 17 for use in the usual manner. The desugarised and dry centrifuged sludge is then removed in known manner by means of a peeler device (not shown) and carried away by suitable conveyor means 11. It is also possible for the deposited sludge to be wetted again with water for desugarising purposes and for it to be centrifuged a second time. The arrangement for carrying out this process is shown in Figure 3, which in essentials only differs from the constructional example according to Figure 2 by the fact that the peeler centrifuge receiving the initially thickened carbonation juice from the thickener 3 has an additional peeler centrifuge connected on the output side thereof as a washing-out centrifuge. In the first peeler centrifuge, there is merely obtained clear juice, which flows out of the centrifuge through the discharge 7. After the clear juice has been centrifuged off, the deposited sludge is peeled out of the centrifuge, water being sprayed in front of the peeler blade through the spray tube during the peeling-off operation. The mash consisting of water and sludge then flows into the desugarising centrifuge 18 connected on the output side for the purpose of separating out the washed liquid. The latter passes through a discharge pipe 19 for use in the ordinary way, whereas the separated dry sludge is carried away by means of suitable conveyor means 11. Separate mashing vessels and wetting arrangements are avoided by these steps.

We claim:

1. Process for treating sugar juice containing carbonation sludge comprising concentrating said sludge to provide a minor portion of thick juice and a major portion of sludge juice, simultaneously and continuously centrifuging and filtering the sludge juice portion to provide a thick juice layer and a sludge layer, continuously separating said thick juice layer from the sludge layer, combining the separated thick juice and said minor portion of thick juice, filtering the combined portions of thick juice, and desugarizing the residual sludge layer.

2. In apparatus for treating sugar juice containing carbonation sludge including separator means for the sludge to provide thick juice and sludge juice, and a filter press, the improvement comprising a centrifuge having a filter layer associated therewith, means for passing sludge juice from the separator means to said centrifuge to provide a layer of thick juice and a sludge layer, means for passing the thick juice from the separator means and from the centrifuge to the filter press, and means for removing the sludge layer from the centrifuge.

3. Apparatus as in claim 2, further comprising means for recycling the thick juice from said centrifuge to said separator means.

4. Apparatus as in claim 2, further comprising a second centrifuge for receiving and treating the sludge of the first mentioned centrifuge.

5. In an apparatus for treating sugar juice containing carbonation sludge, including a separator and a filter press, the improvement comprising a centrifuge and means connecting said centrifuge to the separator and press, said centrifuge having a removable filter layer and skimming means, and means connecting said skimming means with said filter press.

References Cited in the file of this patent

UNITED STATES PATENTS

| 738,328 | Hignette | Sept. 8, 1903 |
| 978,450 | Homans | Dec. 13, 1910 |
| 1,101,940 | Kopke | June 30, 1914 |
| 1,156,060 | Coombs | Oct. 12, 1915 |
| 1,795,006 | Boiney | Mar. 3, 1931 |
| 2,100,118 | Andrews | Nov. 23, 1937 |
| 2,172,320 | Jones | Sept. 5, 1939 |
| 2,429,868 | Campanella | Oct. 28, 1947 |
| 2,443,310 | Eckers | June 15, 1948 |
| 2,464,440 | Delius | Mar. 15, 1949 |
| 2,555,866 | Weaver | June 5, 1951 |

FOREIGN PATENTS

| 133,153 | Austria | May 10, 1933 |
| 13,320 | Great Britain | of 1850 |

OTHER REFERENCES

Spencer-Meade: Cane Sugar Handbook, N.Y., 1945, p. 120.

Deerr: Can Sugar, London, 1921, pp. 299–301.